United States Patent

Narahara et al.

[11] Patent Number: 5,155,720
[45] Date of Patent: Oct. 13, 1992

[54] SERVO CONTROL CIRCUIT FOR IMAGE ROTATOR

[75] Inventors: Tatsuya Narahara; Yoshiteru Kamatani, both of Kanagawa; Takashi Nakao; Hiroshi Miyoshi, both of Tokyo, all of Japan

[73] Assignee: Sony Corporation, Tokyo, Japan

[21] Appl. No.: 597,151

[22] Filed: Oct. 15, 1990

[30] Foreign Application Priority Data

Oct. 16, 1989 [JP] Japan .................. 1-268843

[51] Int. Cl.$^5$ .................................. G11B 7/00
[52] U.S. Cl. ........................ 369/97; 369/113; 369/44.14; 369/44.17; 369/44.18
[58] Field of Search ............ 369/44.14, 44.17, 44.18, 369/97, 113, 114

[56] References Cited

U.S. PATENT DOCUMENTS

| 3,503,058 | 3/1970 | Ault et al. | |
| 4,163,600 | 8/1979 | Russell | 369/44.18 |
| 4,495,609 | 1/1985 | Russell | 369/97 |
| 4,633,455 | 12/1986 | Hudson | 369/97 |
| 4,661,941 | 4/1987 | Bell et al. | 369/97 |
| 4,669,070 | 5/1987 | Bell | 369/97 |
| 4,815,067 | 3/1989 | Webster et al. | 369/97 |
| 4,939,715 | 7/1990 | Vogelgesang et al. | 369/97 |
| 4,970,707 | 11/1990 | Hara et al. | 369/44.17 |
| 4,999,827 | 3/1991 | Miyaoka | 369/97 |

FOREIGN PATENT DOCUMENTS

WO87/02499 6/1987 PCT Int'l Appl. .

*Primary Examiner*—Dale M. Shaw
*Assistant Examiner*—Khoi Truong
*Attorney, Agent, or Firm*—Lewis H. Eslinger; Jay H. Maioli

[57] ABSTRACT

A servo control circuit for an image rotator used in an optical tape recording apparatus that employs a rotary tape drum. Pairs of pulse generators and frequency generators are provided on the image rotator and on the tape drum, respectively. Initially, the pulse generators are used for servo control and, upon detecting a phase lock, servo control is subsequently switched over to be controlled by the frequency generators.

6 Claims, 4 Drawing Sheets

FIG. 3
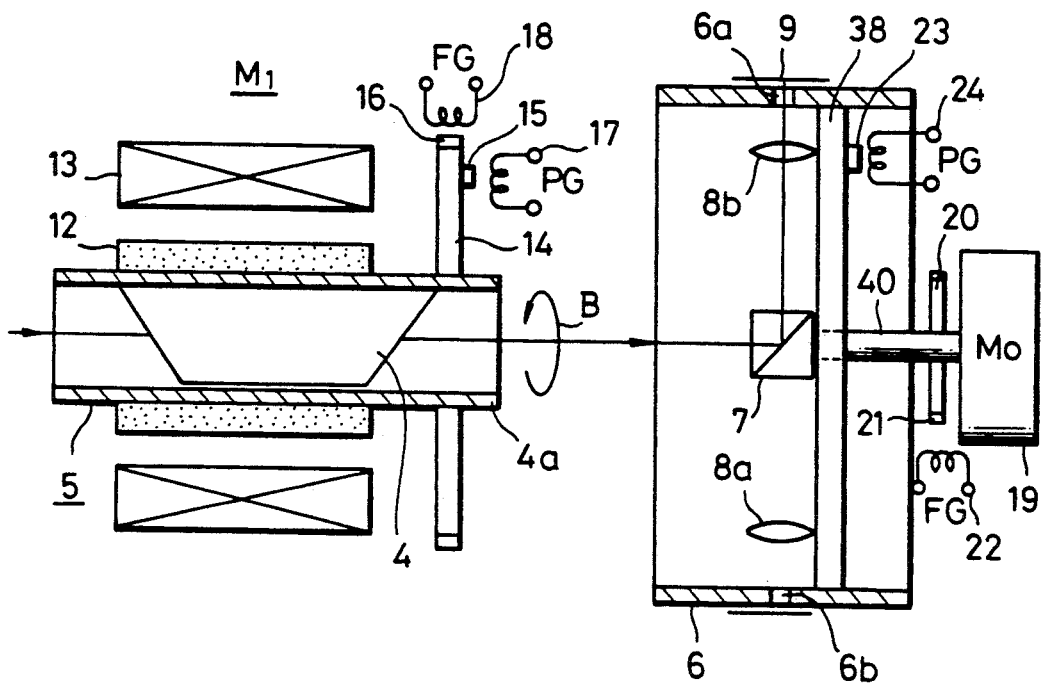
FIG. 5A
FIG. 5B
FIG. 5C
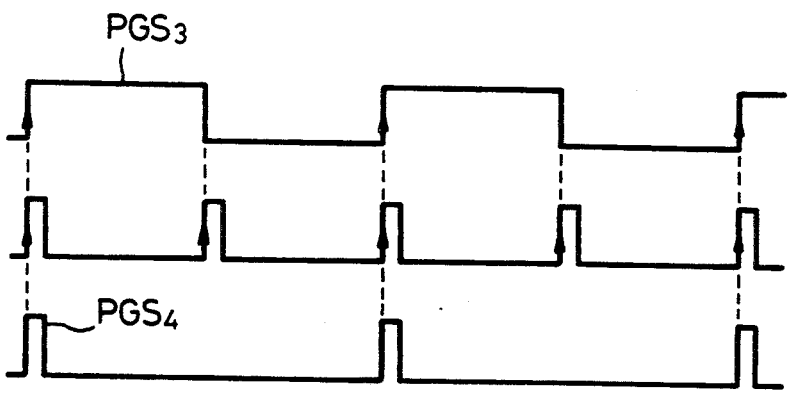

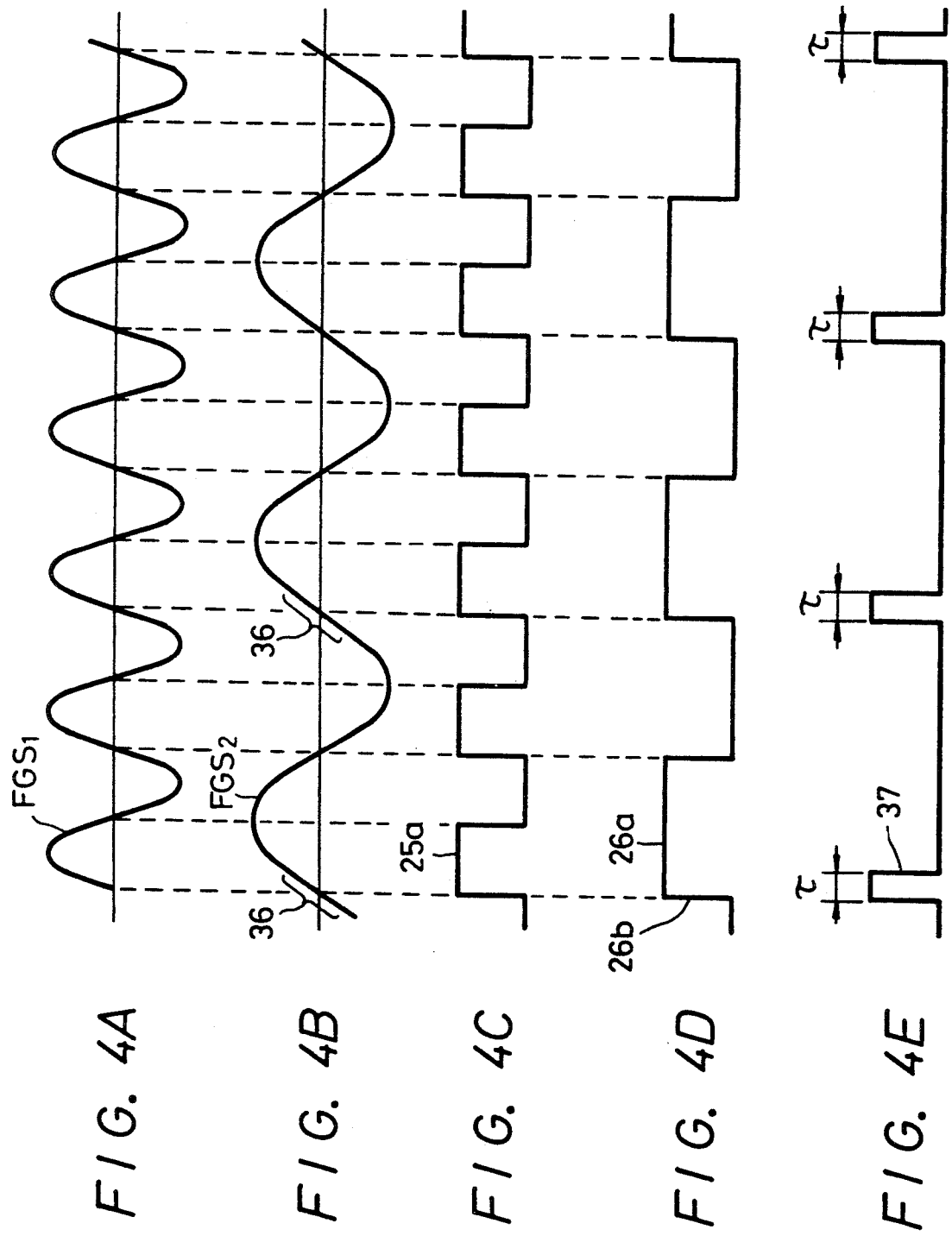

SERVO CONTROL CIRCUIT FOR IMAGE ROTATOR

BACKGROUND OF THE INVENTION

1. Field of the Invention

The present invention relates generally to servo control circuits and, more particularly, to a servo control circuit for an image rotator used in an optical rotary head video recorder.

2. Description of the Background

There has been proposed apparatus for optically recording and/or reproducing video image data, known as a helical-scan optical recording and reproducing apparatus, and Japanese Patent Laid-Open Gazette No. 63-103440 describes an example of such helical-scan optical recording and/or reproducing apparatus. FIG. 1 is a schematic diagram showing an arrangement of the recording and reproducing apparatus of the type described in Japanese Patent Laid-Open Gazette No. 63-103440.

As shown in FIG. 1, a laser light source 1, a beam splitter 2, a mirror 3, and an image rotator 5, including a Dach prism 4, provide the light beam. The Dach prism 4 causes a laser light image to rotate around the optical axis thereof when it is rotated and, typically, image rotator 5 includes a motor (not shown) that rotates Dach prism 4.

The write laser light beam emitted from laser light source 1 travels through beam splitter 2, past mirror 3 to image rotator 5 and is incident on a beam splitter 7 arranged at an upper open portion of a rotary drum 6. Beam splitter 7 is normally located on a central axis of rotary drum 6, however, in order to make the drawing simpler in FIG. 1 the laser beam from laser light source 1 is shown being introduced to beam splitter 7 as though it became incident on beam splitter 7 from the lateral direction of rotary drum 6. Although rotary drum 6 is made of a transparent material, such as glass or the like, it may be formed as a metal cylinder similar to the rotary drum of a conventional video tape recorder (VTR). When the rotary drum is constructed as a metal cylinder, apertures 6a, 6b are bored through rotary drum 6 in the radial direction, whereby the write laser beam incident on the beam splitter 7 is passed through objective lenses 8a, 8b and apertures 6a, 6b onto a recording surface of an optical tape 9. In this way, a laser beam modulated by a video signal is written onto the recording surface of optical tape 9, which is made of an optical record medium such as magneto-optical film and is obliquely wrapped around rotary drum 6 for forming slant tracks along the length of the tape.

In FIG. 1, guide rollers 10a and 10b serve to wrap optical tape 9 around rotary drum 6 and the drum rotates counterclockwise so that tape 9 is transported in the direction shown by arrow A.

A detector 11 receives the laser beam that is reflected from optical tape 9 and that travels back through aperture 6a, beam splitter 7, image rotator 5, mirror 3, and beam splitter 2 and derives the video image data that was previously recorded on tape 9. Detector 11 derives a tracking error signal, a focusing error signal, and an RF (radio frequency) signal representing the video signal. The optical system within rotary drum 6, for example, objective lenses 8a, 8b and the like, is controlled by the tracking error signal and the focusing error signal supplied thereto as feedback signals.

In the aforenoted arrangement, image rotator 5 is servo-controlled to rotate at a rotational speed equal to ½ of the rotary angular velocity of rotary drum 6. This arrangement produces a video image.

In order to have image rotator 5 and rotary drum 6 servo-controlled so as to rotate in synchronism with each other, the rotation of rotary drum 6 is decelerated mechanically by using a gear or the like to rotate image rotator 5 at a rotational speed of ½ the angular velocity of rotary drum 6. Alternatively, as described in Japanese Patent Laid-Open Gazette No. 63-103440, a phase difference between a frequency-divided output signal, which results from dividing the rotation angular velocity signal generated from the image rotator 5 per revolution, is calculated to obtain a synchronization error signal and image rotator 5 is electrically servo-controlled by this synchronization error signal.

When the electrical control operation is performed, such that image rotator 5 is servo-controlled to rotate at a rotational speed equal to ½ the angular velocity of rotary drum 6 in synchronism with rotary drum 6 as described above, an electrical offset adjustment must be performed in order to correct a mounting error between pulse generators (not shown) that are mounted on the rotary drum 6 and image rotator 5. In this example of previously proposed apparatus, the synchronization error of angles between rotary drum 6 and image rotator 5 is detected based on a phase difference of respective pulses, that is, a time difference, so that the offset adjustment is equivalent to the adjustment for correcting the time phase difference. The true synchronization error angle is obtained by multiplying the time phase difference with the rotational velocity. Accordingly, when the rotational velocity changes, a predetermined offset adjustment provides a predetermined phase difference. There is then the substantial disadvantage that the amount of the synchronization error angle will be changed.

Further, because a synchronization error signal is obtained on the basis of a phase difference between one pulse per revolution and a ½ frequency-divided pulse, a servo control operation having high gain and high accuracy becomes impossible.

Furthermore, if the rotary drum and the image rotator are mechanically servo-controlled to rotate in synchronism with each other, such apparatus becomes large in size and, also in this case, a servo control operation of high accuracy cannot be performed with ease.

OBJECTS AND SUMMARY OF THE INVENTION

Accordingly, it is an object of the present invention to provide an improved servo control circuit for an image rotator in which the aforenoted shortcomings and disadvantages of previously proposed systems can be eliminated.

More specifically, it is an object of the present invention to provide a servo control circuit for an image rotator in which a phase servo of high accuracy and high gain can be carried out.

It is another object of the present invention to provide a servo control circuit for an image rotator in which the image rotator can be servo controlled in a stable manner.

It is a further object of the present invention to provide a servo control circuit for an image rotator for use in an optical rotary head that optically records and/or reproduces video image data.

According to an aspect of the present invention, a servo control circuit for an image rotator employed in an optical tape recording apparatus is made up of a first frequency generator coupled to an image rotator for generating first rotation signals, a second frequency generator coupled to an optical rotary head for generating second rotation signals, a rotation member coupled to the image rotator for rotating the image rotator, a phase comparing circuit for comparing the first rotation signals with the second rotation signals and for generating error signals, and a circuit for supplying the error signals to the rotation member for controlling the rotation of the image rotator.

According to another aspect of the present invention, the servo control circuit can be constructed of first pulse generators coupled to the image rotator for generating first pulse signals, second pulse generators coupled to the optical rotary head for generating second pulse signals, and a phase detecting circuit for detecting phase differences between the first and second pulse signals, and for generating phase error signals to be supplied to the rotation members. Thus, a phase servo of high accuracy and high gain can be effected.

The above and other objects, features, and advantages of the present invention will become apparent in the following detailed description of a preferred embodiment when read in conjunction with the accompanying drawings, in which like reference numerals are used to identify the same or similar parts in the several views.

BRIEF DESCRIPTION OF THE DRAWINGS

FIG. 3 is a schematic diagram showing an image rotator and a rotary drum to which the present invention is applied;

FIGS. 4A–4E are waveform diagrams useful in explaining the operation of the embodiment of FIG. 2; and FIGS. 5A–5C are waveform diagrams useful in explaining the operation of the embodiment of FIG. 2.

DETAILED DESCRIPTION OF PREFERRED EMBODIMENTS

Figure 1:
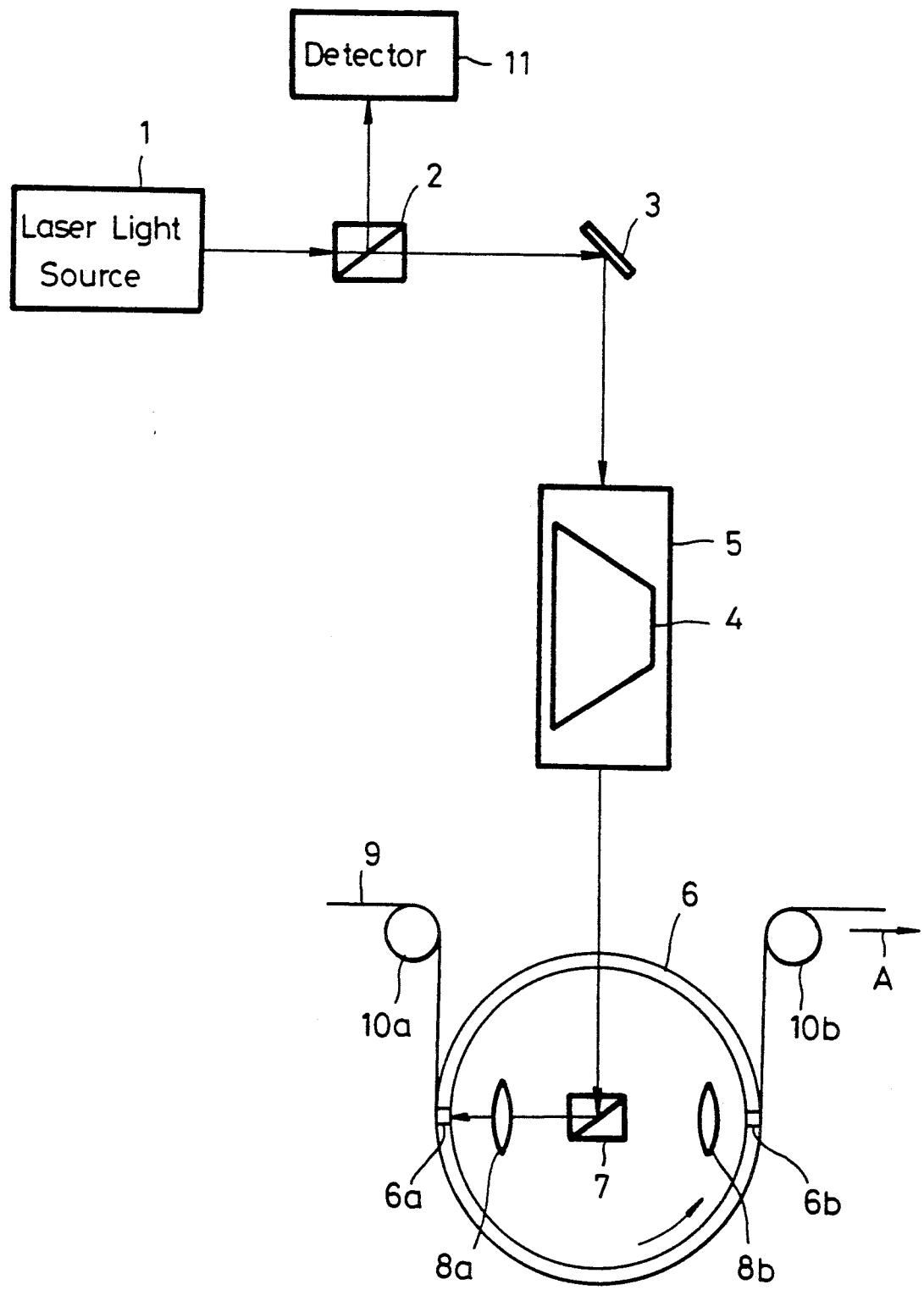
FIG. 1 is a schematic diagram showing an example of an apparatus for optically recording and/or reproducing video image data according to the prior art.

A servo control circuit for an image rotator according to an embodiment of the present invention will be described in detail with reference to FIG. 2 through FIGS. 5A–5C. In order to understand the present invention more clearly, the arrangement of image rotator 5 and the rotary member, that is, rotary drum 6 shown in FIG. 1, are described with reference to FIG. 3 prior to the explanation of the circuit of FIG. 2.

Referring to FIG. 3, in image rotator 5 Dach prism 4 is provided within an axial casing 4a of substantially cylindrical-shaped configuration. Four magnets shown typically at 12, are provided at the four positions that the result from equally dividing the outer periphery of casing 4a into four quadrants, and a disk 14 is secured to one end of the casing 4a. A stationary winding 13 is arranged to oppose the four magnets 12, so that a motor $M_1$ is constructed. When a current flows in stationary winding 13 of motor $M_1$ image rotator 5, including Dach prism 4, the casing 4a, magnets 12, and disk 14, is rotated in the direction shown by arrow B in FIG. 3.

Magnetic material is coated on the outer periphery of disk 14 to form a magnetized pattern 16 of alternate North and South in the circumferential direction of disk 14. Thus, a frequency generator 18 denoted as FG in the drawings is constructed. In frequency generator 18, a thin film head (not shown) such as a magneto-resistance effect (MR) device detects the magnetized pattern and generates an analog signal whose magnitude is changed linearly in response to the magnetic flux, thereby detecting a rotation angular velocity of image rotator 5. Alternatively, this frequency generator 18 may be an angle detector having a lattice-shaped reflection pattern formed around the outer periphery of the disk 14, so that light emitted from a light emitting element is reflected by this reflection pattern and is detected by a light receiving element to produce an analog signal whose magnitude is linearly changed with rotation.

In frequency generator 18, a sine wave signal $FGS_1$, shown in FIG. 4A, is generated upon revolution of the image rotator 5. A pulse generator 17, denoted in the drawings as PG, is provided to detect a magnetized pattern 15 on the inner, flat surface of the disk 14. A light reflection pattern could also be provided to cooperate with a light detecting element. The pulse generator 17 and magnetized pattern 15 operate to generate a sine wave signal $FGS_2$ having a known period for every revolution of image rotator 5.

A write laser beam that is emitted by laser light source 1 and that travels through Dach prism 4 of image rotator 5 is introduced into beam splitter 7 provided on the rotary shaft of an optical system mounting portion 38 of cylindrically shaped rotary drum 6, which may be made of glass or metal, from above. Then, the incident laser beam is refracted 90 degrees by beam splitter 7, travels through an optical system made up of objective lenses 8a and 8b provided in the radial direction of rotary drum 6 and is introduced through the apertures 6a and 6b onto the recording surface of optical tape 9, whereby the video signal used to modulate the light beam is recorded on the recording surface of the optical tape.

Optical system mounting portion 38 is secured at a periphery thereof to the inner periphery of rotary drum 6 and a rotary shaft 40 of a drum drive motor 19 is secured to the center of optical system mount portion 38, thereby rotating rotary drum 6 at high speed in the direction shown by an arrow B in FIG. 3.

On an inner, flat surface of optical system mounting portion 38, one magnetized pattern 23 is provided over a range of 360 degrees. This magnetized pattern 23 is detected by a pulse generator 24 formed of a thin film head, such as a magneto-resistance effect (MR) device or the like. Further, a disk 20 is secured to the rotary shaft 40 of motor 19 and a magnetized pattern 21 is formed on the outer periphery of disk 20. Then, a frequency generator 22 is provided to generate a sine wave signal per revolution of the rotary drum 6.

Figure 2:
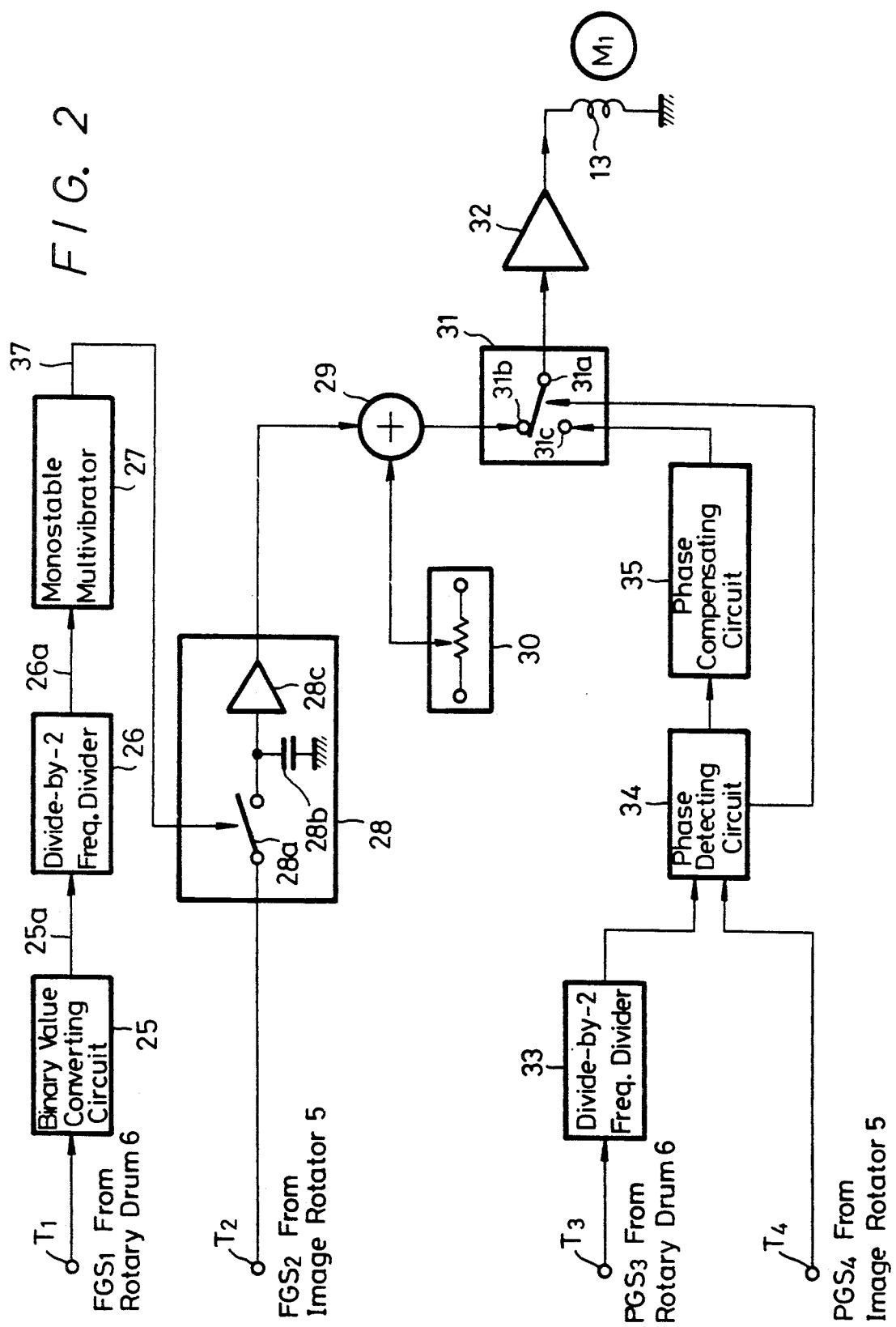
FIG. 2 is a schematic in block diagram form of an embodiment of a servo control circuit for an image rotator according to the present invention.

The servo control circuit for servo-controlling image rotator 5 so that image rotator 5 can be rotated at a rotational speed equal to ½ the rotation angular velocity of rotary drum 6 is described with reference to FIG. 2, in which, an input terminal $T_1$ is supplied with the analog detecting signal $FGS_1$, shown in FIG. 4A, and which is derived from frequency generator 22 of rotary drum 6. Another input terminal $T_2$ is supplied with the analog detecting signal $FGS_2$, shown in FIG. 4B, and which is derived from frequency generator 18 of image rotator 5. The analog detecting signal FGS applied to the input terminal $T_1$ from rotary drum 6 is supplied to a binary value converting circuit 25, in which it is converted to a square wave signal 25a, whose waveform is shown in FIG. 4C. This square wave signal 25a is fed to a divide-by-two frequency divider 26 in which it is frequency-divided to provide a squarewave signal 26a shown in FIG. 4D, having a frequency that is one half the frequency of the squarewave signal 25a. The phase of the squarewave signal 26a is matched with the phase of the analog detecting signal $FGS_2$ from pulse generator 18 of the image rotator 5, so that a leading edge 26b of the square wave 26a corresponds to a straight line portion 36 of the analog detecting signal $FGS_2$. The squarewave signal 26a is supplied to a monostable multivibrator 27, so that when the monostable multivibrator 27 is triggered at the leading edge 26b of the pulse wave 26a, the monostable multivibrator 27 generates a pulse waveform 37. The pulse waveform 37 is shown in FIG. 4E where it is seen that the pulses have a predetermined width $\tau$ that is determined by the monostable multivibrator 27. These pulses are used to sample the straight line portion 36 of the analog detecting signal $FGS_2$ fed in at terminal $T_2$ supplied to a sample and hold circuit 28 that is turned ON and OFF by pulse waveform 37. Sample and hold circuit 28 is formed of a switch 28a for performing the sampling operation, a capacitor 28b that is connected to ground for performing the holding operation, and an amplifier 28c.

Sample and hold circuit 28 derives an output corresponding to the angular velocity phase, so that when an adding circuit 29 adds a reference phase signal from a reference phase circuit 30 to this output, adding circuit 29 generates a servo signal by which the angular velocity is made one half relative to the rotational angular velocity of rotary drum 6. This servo signal from the adding circuit 29 is supplied through a fixed contact 31b of a switch 31, its movable contact 31a, and a drive amplifier 32 to stationary winding 13 of the motor $M_1$ of image rotator 5.

The instantaneous detecting signals that are generated by pulse generators 24 and 17 of rotary drum 6 and the image rotator 5, each of which has one complete wave per revolution, are supplied to input terminals $T_3$ and $T_4$, respectively, as squarewave signals, the waveform of one such signal $PGS_3$ is shown in FIG. 5A. This signal results from waveform shaping the sine wave analog detecting signal produced by the respective detector in a binary value converting circuit (not shown).

The detecting signal $PGS_3$, shown in FIG. 5A, from pulse generator 24 of rotary drum 6 is supplied to a divide-by-two frequency divider 33. Frequency divider 33 produces a pulse only at the rising edge of the pulse of the detecting signal $PGS_3$, as shown in FIG. 5B. This pulse is supplied to one input terminal of a phase detecting circuit 34 and a detecting signal $PGS_4$, shown in FIG. 5C, is directly supplied from the generator 17 of image rotator 5 through the input terminal $T_4$ to the other input of phase detecting circuit 34. Phase detecting circuit 34 phase-compares the detecting outputs PGS and PGS to generate a phase error signal. The phase error signal from phase detecting circuit 34 is supplied through a phase-compensating circuit 35, the fixed contact 31c and the movable contact 31a of the switch 31 and a drive amplifier 32 to a stationary winding 13 of the motor $M_1$ of image rotator 5. When the phase detecting circuit 34 detects the locked condition, movable contact 31a of switch 31 is switched from fixed contact 31c to fixed contact 31b, whereby the phase servo control by pulse generators 24 and 17 is switched to the phase servo control by frequency generators 22 and 18 of rotary drum 6 and image rotator 5, respectively. Thus, the phase servo control having high accuracy and high gain can be effected.

In the above-described embodiment, the analog detecting signal from rotary drum 6 is converted to a squarewave signal and the analog detecting signal of image rotator 5 is subsequently sampled. Conversely, the analog detecting signal from image rotator 5 could be converted to a squarewave signal and the analog detecting signal from rotary drum 6 sampled, with the same advantageous action and effects being achieved.

As set out above, according to the servo control circuit for the image rotator, the phase error signal can be provided to servo control the image rotator of the helical scan optical recording and/or reproducing apparatus in a stable manner.

Furthermore, because the phase servo control being provided by the pulse generators is switched to phase servo by the frequency generators upon detecting a phase lock, phase servo control of high accuracy and high gain can be effected.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention, as defined in the appended claims.

We claim as our invention:

1. A servo control circuit for an image rotator used in an optical tape recording apparatus that employs an optical rotary head, comprising:
   first frequency generator means coupled to the image rotator for generating first rotation signals;
   second frequency generator means coupled to the optical rotary head for generating second rotation signals;
   motor means for rotating said image rotator;
   means for comparing said first rotation signals with said second rotation signals for generating an angular velocity phase signal;
   first pulse generator means coupled to the image rotator for generating first pulse signals;
   second pulse generator means coupled to the optical rotary head for generating second pulse signals;
   phase detecting means for detecting a phase difference between said first pulse signals and second pulse signals and generating a phase error signal; and
   selector switch means operative in response to said phase error signal for selectively supplying said phase error signal from said phase detecting means to said motor means and said angular velocity phase signal from said means for comparing to said motor means for controlling the rotation of said image rotator.

2. The servo control circuit according to claim 1, wherein said means for comparing includes sampling means for sampling instantaneous waveforms of one of said first and second rotation signals using the other of said first and second rotation signals.

3. The servo control circuit according to claim 1, further comprising a first divide-by-two frequency divider for dividing a frequency of said second rotation signals by two and a second divide-by-two frequency divider for dividing a frequency of said second pulse signals by two, whereby a rotational speed of the image rotator is controlled to be one half a rotational speed of the optical rotary head.

4. The servo control circuit according to claim 2, wherein said sampling means includes a sampling switch for performing the sampling of instantaneous waveforms and is connected to be operated in response to said second rotation signals to sample said first rotation signals.

5. The servo control circuit according to claim 4, further comprising:
   a first divide-by-two frequency divider for dividing a frequency of said second rotation signals by two,
   a second divide-by-two frequency divider for dividing a frequency of said second pulse signals by two; and
   a monostable multivibrator receiving an output of said first divide-by-two frequency divider and producing a pulsed output signal for controlling said sampling switch, whereby a rotational speed of the image rotator is controlled to be one half a rotational speed of the optical rotary head.

6. The servo control circuit according to claim 5, further comprising an adding circuit connected to an output of said sampling means for adding a reference phase component thereto and producing an output fed to said selector switch means.

* * * * *